(12) United States Patent
Kim et al.

(10) Patent No.: US 9,951,663 B2
(45) Date of Patent: Apr. 24, 2018

(54) MULTISTAGE BYPASS VALVE

(71) Applicant: Hyundai Motor Company, Seoul (KR)

(72) Inventors: One Vai Kim, Suwon-si (KR); Hong Youl Lee, Gwangmyeong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 289 days.

(21) Appl. No.: 14/854,845

(22) Filed: Sep. 15, 2015

(65) Prior Publication Data

US 2016/0369670 A1    Dec. 22, 2016

(30) Foreign Application Priority Data

Jun. 16, 2015  (KR) .................. 10-2015-0085420

(51) Int. Cl.
| | | |
|---|---|---|
| G05D 23/19 | (2006.01) |
| F01P 7/02 | (2006.01) |
| F01P 7/14 | (2006.01) |
| F01P 11/08 | (2006.01) |
| F28D 7/10 | (2006.01) |
| B60H 1/00 | (2006.01) |
| G05D 23/00 | (2006.01) |
| F01M 5/00 | (2006.01) |
| F16K 31/00 | (2006.01) |
| G05D 23/02 | (2006.01) |

(52) U.S. Cl.
CPC ........... F01M 5/007 (2013.01); F16K 31/002 (2013.01); G05D 23/022 (2013.01)

(58) Field of Classification Search
CPC ... F01M 5/007; F16K 31/002; G05D 23/1852
USPC ..... 123/179.19, 196 AB, 41.08, 41.1, 41.31, 123/41.33; 165/140, 202, 297, 298; 236/34.5
See application file for complete search history.

(56) References Cited

U.S. PATENT DOCUMENTS

| 4,488,680 A | * | 12/1984 | Itoh ................. F16K 31/002 236/100 |
| 5,067,454 A | * | 11/1991 | Waddington ............ F01D 25/20 123/196 AB |
| 5,934,552 A | * | 8/1999 | Kalbacher ............ G05D 23/022 236/12.2 |
| 6,867,395 B2 | | 3/2005 | Santanam |

(Continued)

FOREIGN PATENT DOCUMENTS

| EP | 318208 A2 | 5/1989 |
| JP | 06-012707 U | 2/1994 |

(Continued)

OTHER PUBLICATIONS

Korean Office Action dated Jun. 17, 2016, issued in Korean patent application No. 10-2015-0085420.

*Primary Examiner* — Henry Crenshaw
(74) *Attorney, Agent, or Firm* — McDermott Will & Emery LLP (57) ABSTRACT

A multistage bypass valve includes a housing having a plurality of chambers therein, wherein expansive waxes that change volume according to temperature changes are provided in the chambers, a spool inserted into the housing and moved by one or more volume changes of the expansive waxes, and a piston that opens and closes an oil cooler passage as the spool is moved.

10 Claims, 5 Drawing Sheets

(56) References Cited

U.S. PATENT DOCUMENTS

| | | | |
|---|---|---|---|
| 7,175,102 B2 * | 2/2007 | Inoue | G01K 5/44 |
| | | | 236/100 |
| 2008/0029246 A1 * | 2/2008 | Fratantonio | F16H 57/0412 |
| | | | 165/103 |
| 2008/0093066 A1 * | 4/2008 | Bird | F01M 5/005 |
| | | | 165/297 |
| 2010/0095908 A1 * | 4/2010 | Deivasigamani | G05D 23/134 |
| | | | 123/41.1 |
| 2011/0061744 A1 * | 3/2011 | Zillig | F15B 21/042 |
| | | | 137/15.01 |
| 2012/0090815 A1 * | 4/2012 | Cameron | F16K 31/002 |
| | | | 165/67 |
| 2012/0211216 A1 * | 8/2012 | Noonchester | F01M 5/021 |
| | | | 165/271 |
| 2013/0020513 A1 * | 1/2013 | Matsusaka | F01P 7/165 |
| | | | 251/63.6 |
| 2013/0153475 A1 * | 6/2013 | Jainek | B01D 35/147 |
| | | | 210/149 |

FOREIGN PATENT DOCUMENTS

| | | | |
|---|---|---|---|
| JP | 4293506 | B2 | 7/2009 |
| KR | 20-1999-0032829 | U | 7/1999 |
| KR | 10-1501147 | * | 3/2015 |
| KR | 10-1501147 | B1 | 3/2015 |
| WO | 2004-079466 | A2 | 9/2004 |

* cited by examiner

MULTISTAGE BYPASS VALVE

CROSS-REFERENCE TO RELATED APPLICATION

The present application claims priority to Korean Patent Application No. 10-2015-0085420, filed on Jun. 16, 2015 with the Korean Intellectual Property Office, which is incorporated herein by reference in its entirety.

TECHNICAL FIELD

The present disclosure relates to a multistage bypass valve in which one thermostat valve performs the functions of a plurality of thermostat valves.

BACKGROUND

A bypass valve according to the related art bypasses an oil such that the oil does not pass through an oil cooler at or below a preset oil temperature, and passes the oil through the oil cooler if the oil temperature exceeds the preset oil temperature so that overheating of the oil can be prevented. This configuration is provided to improve fuel consumption by reducing hydraulic pressure losses generated when the oil passes through the oil cooler.

However, as cooling water introduced into the oil cooler raises the temperature of the oil introduced into the oil cooler at an initial stage of vehicle startup, an oil lubrication effect deteriorates and a fuel efficiency effect is reduced when a general one-stage thermostat valve is applied.

Accordingly, by applying two one-stage thermostat valves, rapid rising of the oil temperature is induced by supplying the oil to the oil cooler at a low temperature. A pressure difference reduction effect is shown by operating a primary thermostat valve and bypassing the oil through the oil cooler if the temperature of the oil reaches a low temperature setting temperature, and the oil is supplied to the oil cooler again by operating a secondary thermostat valve if the temperature of the oil reaches a high temperature setting temperature, so that the coil can be efficiently cooled.

However, to achieve this, two first stage thermostat valves should be connected in series. Accordingly, manufacturing costs increase and the size and volume of the product also increases.

The description provided above as a related art of the present disclosure is just for helping in understanding the background of the present disclosure and should not be construed as being included in the related art known by those skilled in the art.

SUMMARY

The present disclosure has been made in an effort to solve the above-mentioned problems, and provides a multistage bypass valve which opens an oil cooler passage during a cooling startup, bypasses an oil at a middle temperature, and opens the oil cooler passage again at a high temperature by providing a plurality of expansive wax that react at different temperatures therein.

In one aspect, the present disclosure provides a multistage bypass valve including: a housing having a plurality of chambers therein, wherein expansive waxes that change volume according to temperature changes are provided in the chambers; a spool inserted into the housing and moved by one or more volume changes of the expansive waxes; and a piston that opens and closes an oil cooler passage as the spool is moved.

A first expansive wax that expands at a predetermined temperature may be provided in one of the chambers of the housing, and a second expansive wax that expands at a temperature higher than the predetermined temperature may be provided in the other chamber.

When both the first expansive wax and the second expansive wax are contracted, the piston may continue to open the oil cooler passage.

When only the first expansive wax of the expansive wax is expanded, the piston may close the oil cooler passage as the spool is moved.

When both the first expansive wax and the second expansive wax are expanded, the piston may be moved to open the oil cooler passage as the spool is moved.

The temperature at a time point where the second expansive wax expands may be higher than a temperature at a time point where the first expansive wax is completely expanded.

The multistage bypass valve may further include boot forming the chambers and provided to surround the spool is further provided within the housing.

A fixing part protrudes from one side of the housing such that the boot is fixed to the housing.

One end of the spool is inserted into the housing such that the spool passes through the chambers, and an opposite end of the spool protrudes to the outside of an opposite side of the housing to be connected to the piston.

One end of the spool has a wedge shape such that the spool moves to an opposite side as the expansive wax are expanded.

The multistage bypass valve may further include a cover including a hole through which the spool passes to be moved at an opposite end of the housing.

According to the multistage bypass valve having the above-mentioned structure, rising of the temperature of the oil of the vehicle can be induced and lubrication can be smoothly performed by supplying the oil to the oil cooler during a cooling startup.

Furthermore, fuel ratio can be improved by bypassing the oil such that the oil does not pass through the oil cooler and reducing hydraulic pressure loss due to the oil cooler at a certain temperature or less, and the oil can be cooled and damage to the vehicle can be prevented by introducing the oil into the oil cooler at a certain temperature or more.

In addition, because expansive wax having different reaction temperatures are applied to one valve, a bypass state of the coil cooler having three steps can be adjusted by one bypass valve.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to exemplary embodiments thereof illustrating the accompanying drawings which are given herein below by way of illustration only, and thus are not limitative of the present disclosure, and wherein.

It should be understood that the appended drawings are not necessarily to scale, presenting a somewhat simplified representation of various preferred features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, a multistage bypass valve according to an exemplary embodiment of the present disclosure will be described with reference to the accompanying drawings.

Figure 1:
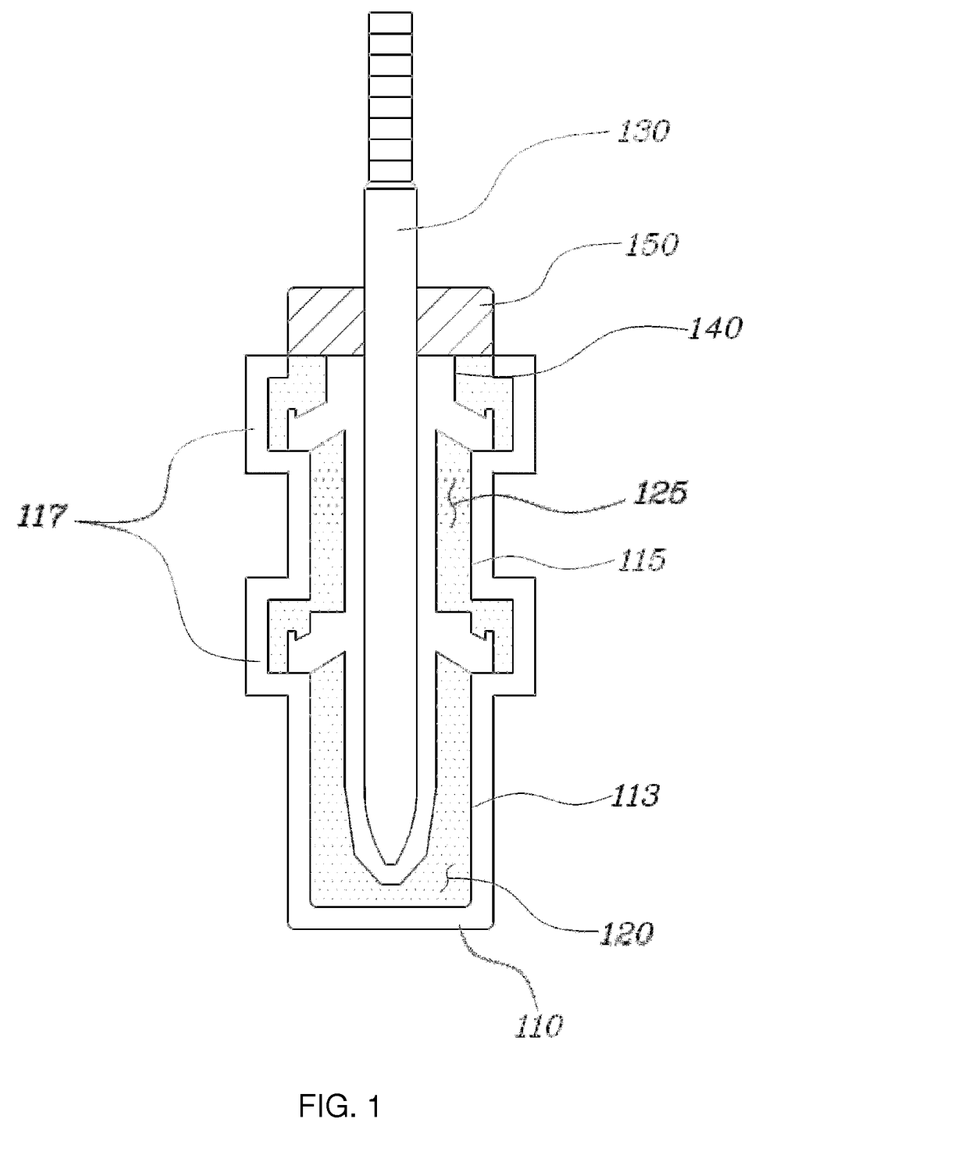
FIGS. 1 to 3 are sectional views illustrating a housing and a spool according to an embodiment of the present disclosure.
Figure 2:
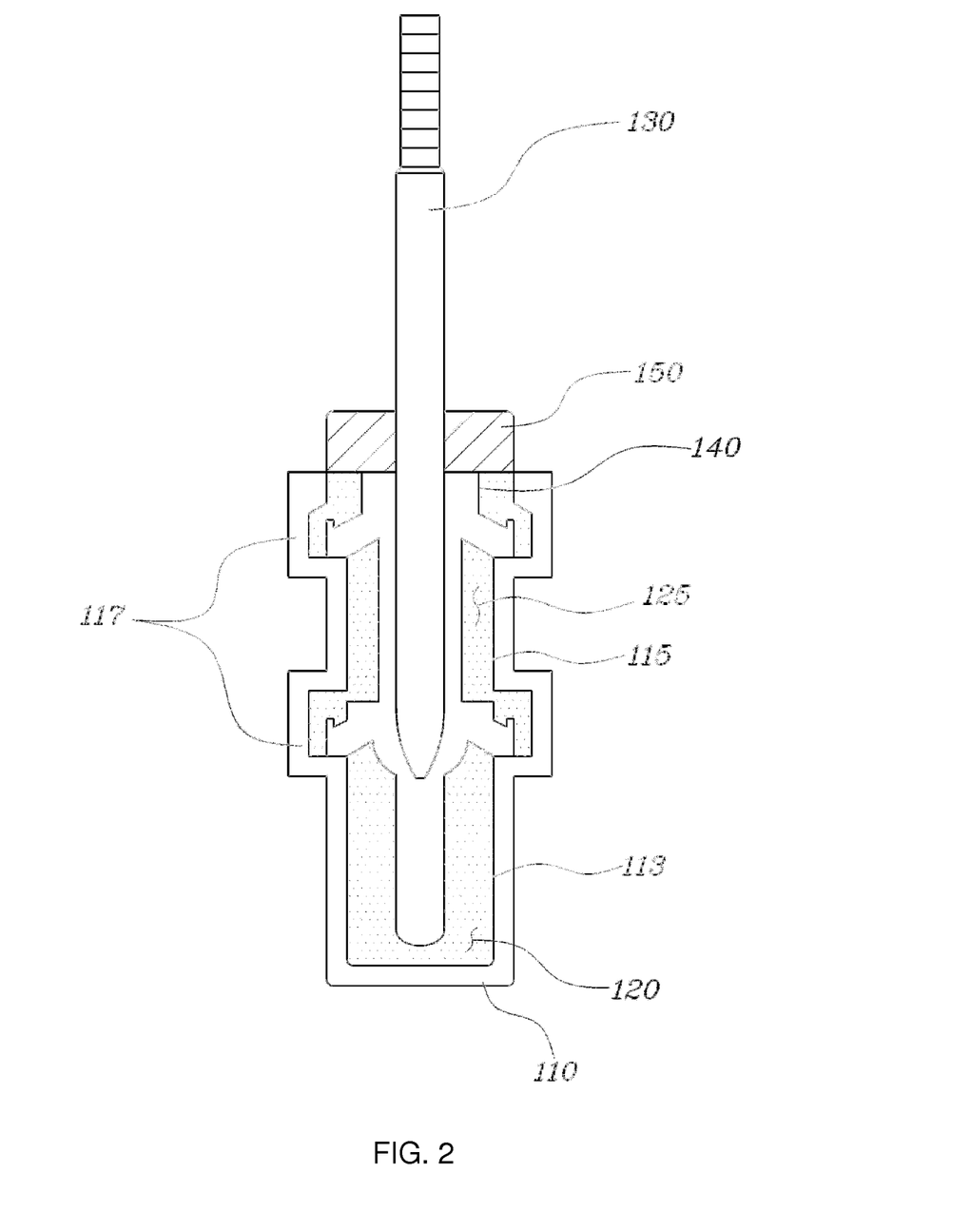
Figure 3:
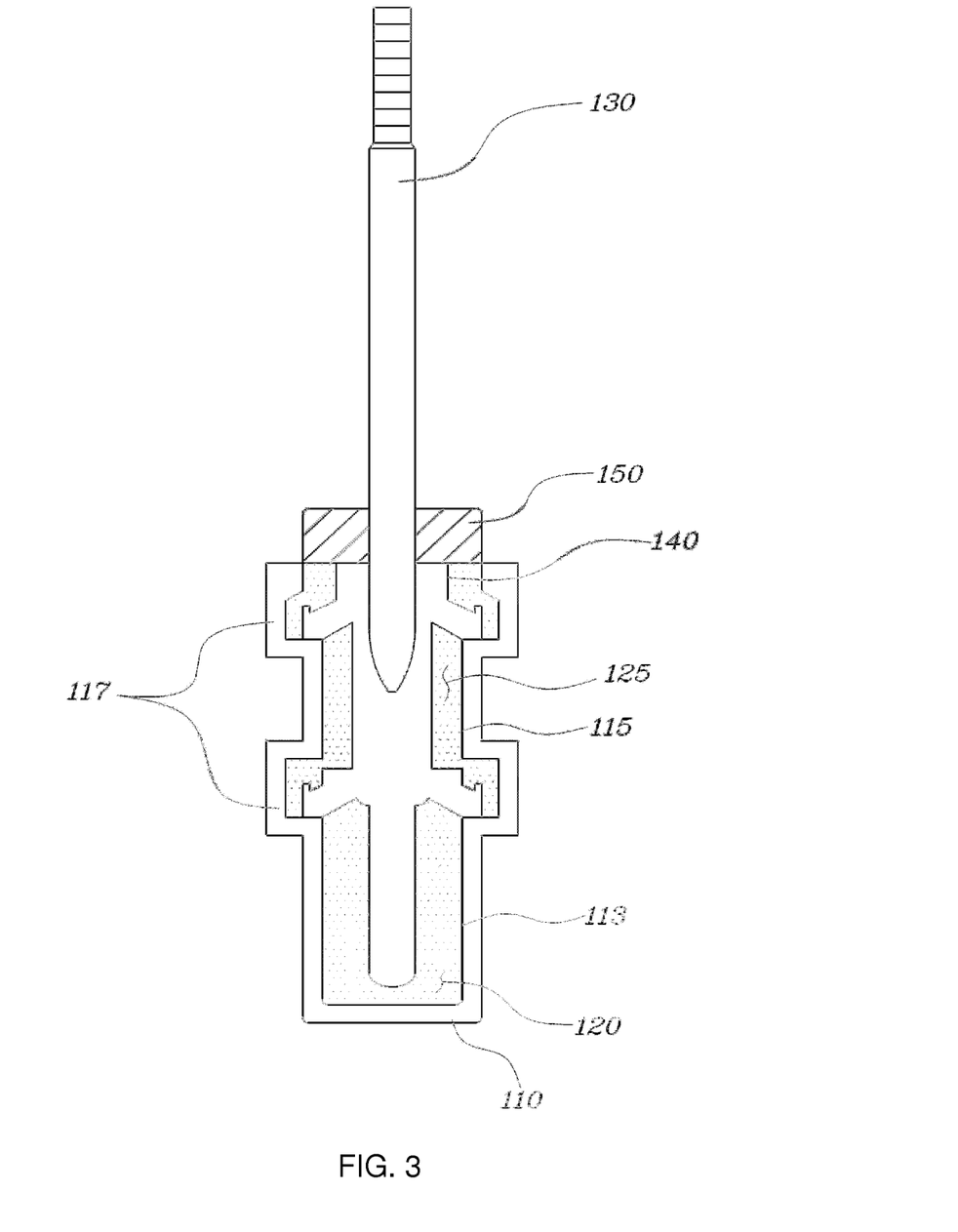
Figure 4:
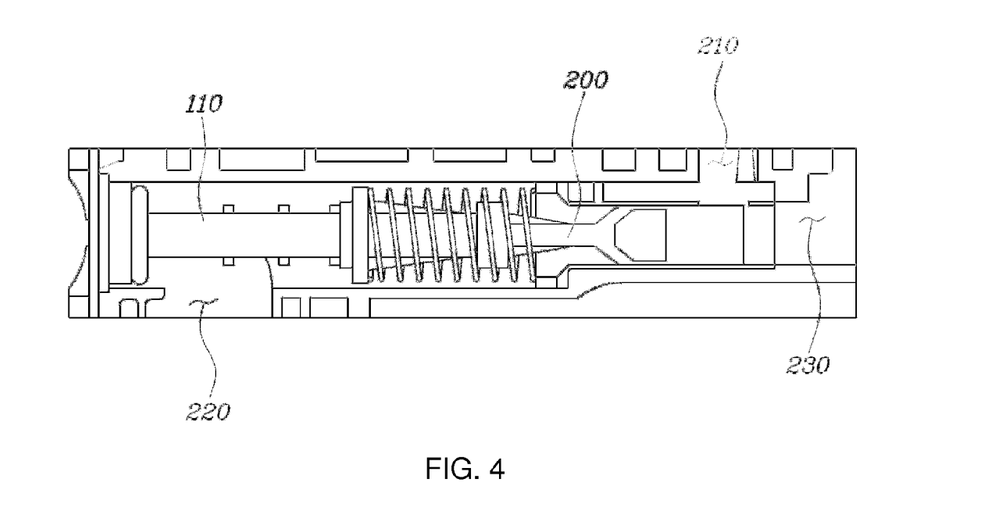
FIGS. 4 to 6 are views illustrating operations of a multistage bypass valve according to an embodiment of the present disclosure.
Figure 5:
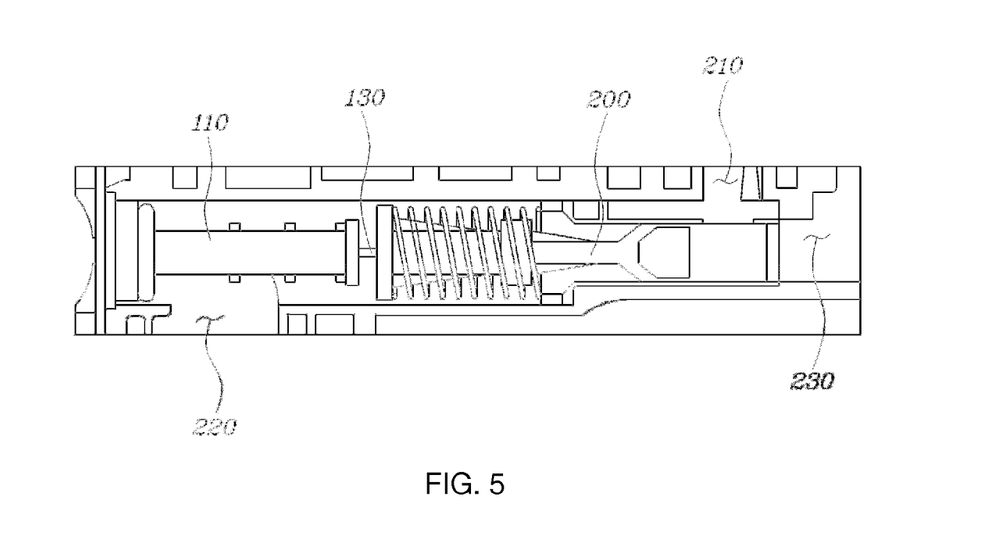
Figure 6:
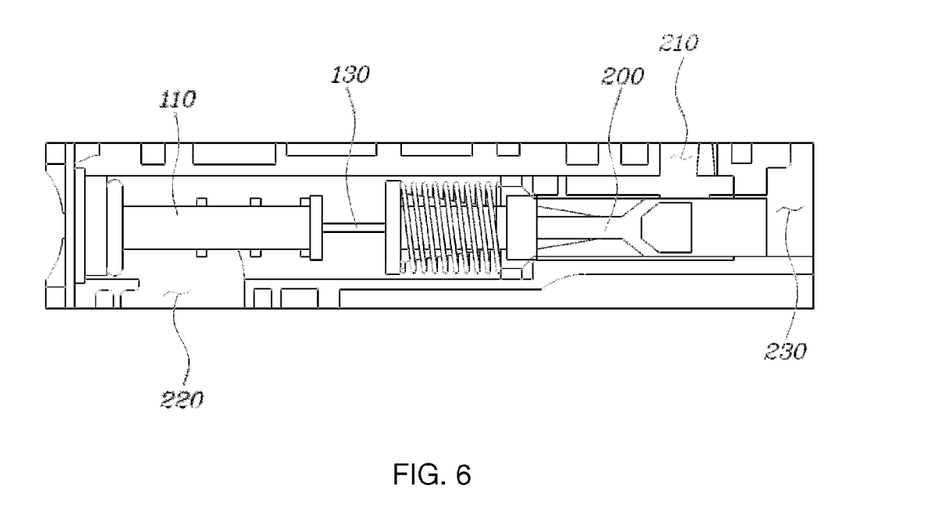

FIGS. 1 to 3 are sectional views illustrating a housing and a spool according to an embodiment of the present disclosure. FIGS. 4 to 6 are views illustrating operations of a multistage bypass valve according to an embodiment of the present disclosure.

Referring to FIGS. 1 to 6, the multistage bypass valve may include a housing 110 having a plurality of chambers 113 and 115 therein, wherein expansive waxes 120 and 125 that expand or contract at different temperatures are provided in chambers 113 and 115, respectively; a spool 130 inserted into the housing 110 and moved by the expansive waxes 120 and 125; and a piston 200 that opens and closes an oil cooler passage 210 as the spool 130 is moved.

The multistage bypass valve is provided between an oil tank, an oil cooler and an oil filter, and is configured to supply an oil introduced from the oil tank to the oil tank or the oil cooler depending on the temperature of the oil.

The housing 110 is provided on a side close to the oil tank passage such that the expansive waxes 120 and 125 are effectively expanded or contracted according to the temperature of the oil introduced from the oil tank. The piston 200 is provided on a side close to the oil cooler passage 210. This configuration is conceived to introduce the oil into the oil cooler passage 210 or the oil filter passage 230 depending on the temperature of the oil as the piston 200 opens and closes the oil cooler passage 210 when the expansive waxes 120 and 125 are expanded.

As described above, the housing 110 includes a plurality of expansive waxes 120 and 125 that are expanded at different temperatures therein, and the spool 130 inserted into the housing 110 is moved according to whether the expansive waxes 120 and 125 are expanded. Here, the expansive waxes 120 and 125 may be a plurality of waxes having different reaction temperatures.

The spool 130 is inserted into the housing 110 from an opposite end of the housing 110, and may be moved as the expansive waxes 120 and 125 provided in the chambers 113 and 115 are expanded while in the chambers 113 and 115. For example, the interiors of the chambers 113 and 115 may be filled with the spool 130 and the expansive waxes 120 and 125, and because internal spaces in the chambers 113 and 115 are insufficient if the expansive waxes 120 and 125 are expanded, the expansive waxes 120 and 125 may push the spool 130 outwards. Accordingly, the spool 130 is moved, and the piston 200 is moved to open and close the oil cooler passage 210 as the spool 130 is moved.

As the plurality of expansive waxes 120 and 125 having different expansion temperatures are provided within the housing 110, and the oil cooler passage 210 is opened and closed as the expansive wax 120 and 125 are expanded, motions of three pistons 200 can be influenced using one housing 110 and one spool 130.

Meanwhile, a first expansive wax 120 that expands at a predetermined temperature may be provided in one of the chambers 113 of the housing 110, and a second expansive wax 125 that expands at a temperature higher than the predetermined temperature may be provided in the other chamber 115.

In the embodiment, two chambers 113 and 115 are provided within the housing 110. The expansion temperature of the first expansive wax 120 provided in one of the chambers 113 is set to be lower than the expansion temperature of the second expansive wax 125. For example, if the temperature of the oil rises to a predetermined temperature from a temperature lower than a certain temperature, the first expansive wax 120 starts to expand, and the spool 130 provided within the one chamber 113 is moved to the outside. Thereafter, the second expansive wax 130 starts to expand when the temperature of the oil is higher than a certain temperature, and the spool 130 of the other chamber 115 is moved to the outside within the chamber 115. In this way, as the spool 130 is moved, the piston 200 is moved to open and close the oil cooler passage 210.

When both the first expansive wax 120 and the second expansive wax 125 are contracted, the piston 200 continues to open the oil cooler passage 210. When only the first expansive wax 120 of the expansive wax is expanded, the piston 200 closes the oil cooler passage 210 as the spool 130 is moved. When both the first expansive wax 120 and the second expansive wax 125 are expanded, the piston 200 is moved to open the oil cooler passage 210 as the spool 130 is moved.

Accordingly, when the temperature of the oil is lower than a certain temperature during a cooling start-up of the vehicle as illustrated in FIG. 1, both the first expansive wax 120 and the second expansive wax 125 are contracted and thus the piston 200 is not moved. Because the piston 200 does not reach the oil cooler passage 210 as illustrated in FIG. 4 and the oil cooler passage 210 is partially opened or fully opened, the oil may be introduced into the oil cooler. Accordingly, because the temperature of the oil of a low temperature is raised during a cooling startup of the vehicle, an oil lubrication effect can be maximized.

Meanwhile, if the temperature of the oil of the vehicle rises to a temperature higher than a certain temperature as illustrated in FIG. 2, only the first expansive wax 120 starts to expand, and the piston 200 is moved to an opposite side. In this way, the piston 200 moved due to the expansion of the first expansive wax 120 blocks the oil cooler passage 210 as illustrated in FIG. 5 to reduce hydraulic pressure losses generated when the oil is unnecessarily introduced into the oil cooler.

When the temperature of the oil of the vehicle rises to a high temperature such that both the first expansive wax 120 and the second expansive wax 125 are expanded as illustrated in FIG. 3, the piston 200 is moved to pass by the oil cooler passage 210 as illustrated in FIG. 6 to open the oil cooler passage 210. Accordingly, the oil of a high temperature is supplied to the oil cooler such that the oil is cooled and damage to components of the vehicle due to high-temperature oil can be prevented.

The temperature at which the first expansive wax 120 expands may be set to a temperature where the rising of the temperature of the oil using the oil cooler is not efficient. Furthermore, the temperature at which the second expansive wax 125 expands may be set to a temperature where the temperature of the oil increases such that a component of the vehicle may be damaged. However, because it is preferable that the temperatures at which the first expansive wax 120 and the second expansive wax 125 start to expand be variably set according to the designer or the vehicle, the temperatures are not limited thereto.

Moreover, the temperature where the second expansive wax 125 expands may be higher than a temperature at a time point where the first expansive wax 120 is completely expanded.

For example, if it is assumed that the temperature of the oil continues to rise, the first expansive wax 120 having a lower reaction temperature may start to expand first. However, if the second expansive wax 125 is set to be expanded while the first expansive wax 120 is not completely expanded, it may be impossible to move the spool 130 by the second expansive wax 125 because the spool 130 does not deviate within the one chamber 113.

Accordingly, it may be preferable that the temperature where the second expansive wax 125 starts to expand is set to be higher than the temperature where the first expansive wax 120 is completely expanded such that the spool 130 is smoothly moved.

Meanwhile, a boot 140 forming the chambers 113 and 115 and provided to surround the spool 130 may be further provided within the housing 110.

That is, the boot 140 may be inserted into the housing 110 such that a plurality of chambers 113 and 115 are formed within the housing 110 while the housing 110 may not have a complex shape. Accordingly, the boot 140 may prevent the expansive waxes 120 and 125 from being introduced into another chamber and the spool 130 may be provided to partition the expansive waxes 120 and 125. In particular, the boot 140 may be formed of a material that may be resiliently deformed by an external force such that the spool 130 is easily moved as the boot 140 surrounds the spool 130.

According to the configuration of the boot 140, even though a plurality of housings 110 and a plurality of spools 130 are not provided, the expansive waxes 120 and 125 having different reaction temperatures are partitioned such that an opening/closing operation of the oil cooler passage 210 having three steps can be performed by smoothly moving the spool 130.

Moreover, a fixing part 117 protrudes from one side of the housing 110 such that the boot 140 is fixed to the housing 110. That is, the boot 140 may be fixed to the inside of the housing 110 while surrounding the spool 130 and partitioning the chambers 113 and 115. Accordingly, because a separate fixing unit for fixing the boot 140 may not be added to the outside of the housing 110, the volume of the package can be minimized.

Meanwhile, one end of the spool 130 may be inserted into the housing 110 such that the spool 130 passes through the chambers 113 and 115, and an opposite end of the spool 130 may protrude to the outside of an opposite side of the housing 110 to be connected to the piston 200.

The one end of the spool 130 may have a wedge shape such that the spool 130 moves to an opposite side as the expansive waxes 120 and 125 are expanded.

For example, when the temperature of the oil is a certain temperature or less, one end of the spool 130 is provided in one chamber 113 of the housing 110 and the one end of the spool 130 is moved to an opposite side due to the expansion of the first expansive wax 120 as the temperature of the oil increases. Furthermore, one end of the spool 130 is inserted via the chambers 113 and 115, and the one end of the spool 130 deviates from one chamber 113 to be provided in the other chamber 115 if the first expansive wax 120 is completely expanded, and one end of the spool 130 is moved to an opposite side due to the expansion of the second expansive wax 125 as the temperature of the oil further increases. Accordingly, the piston 200 connected to an opposite end of the spool 130 is moved, and the oil cooler passage 210 may be opened and closed as the expansive waxes 120 and 125 are expanded.

Because one end of the spool 130 has a wedge shape, the spool 130 may be smoothly moved to an opposite side in the other chamber when the one end of the spool 130 is moved to the other chamber 115 as the first expansive wax 120 is completely expanded and the second expansive wax 125 is expanded.

Meanwhile, a cover 150 including a hole through which the spool 130 passes to be moved may be provided at an opposite end of the housing 110. The cover 150 is provided to open the spool 130 such that the spool 130 is moved to the outside of an opposite side of the housing 110 so that the boot 140 in the interior of the housing 110 can be protected and leakage of the expansive wax 120 and 125 can be prevented.

According to the multistage bypass valve having the above-mentioned structure, rising of the temperature of the oil of the vehicle can be induced and lubrication can be smoothly performed by supplying the oil to the oil cooler during a cooling startup.

Furthermore, fuel efficiency may be improved by bypassing the oil such that the oil does not pass through the oil cooler, reducing hydraulic pressure losses due to the oil cooler at a certain temperature or below, and the oil can be cooled and damage to the vehicle may be prevented by introducing the oil into the oil cooler at a certain temperature or above.

In addition, because expansive wax having different reaction temperatures are applied to one valve, a bypass state of the coil cooler having three steps may be adjusted by one bypass valve.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:
1. A multistage bypass valve comprising:
a housing having a plurality of chambers therein, wherein expansive waxes that change volume according to temperature changes are provided in the chambers;
a spool inserted into the housing and moved by one or more volume changes of the expansive waxes; and
a piston that opens and closes an oil cooler passage as the spool is moved, and
wherein a boot forming the chambers and provided to surround the spool is further provided within the housing.

2. The multistage bypass valve of claim 1, wherein a first expansive wax that expands at a predetermined temperature is provided in one of the chambers of the housing, and a second expansive wax that expands at a temperature higher than the predetermined temperature is provided in a second chamber.

3. The multistage bypass valve of claim 2, wherein when both the first expansive wax and the second expansive wax are contracted, the piston continues to open the oil cooler passage.

4. The multistage bypass valve of claim 2, wherein when only the first expansive wax of the expansive wax is expanded, the piston closes the oil cooler passage as the spool is moved.

5. The multistage bypass valve of claim 2, wherein when both the first expansive wax and the second expansive wax are expanded, the piston is moved to open the oil cooler passage as the spool is moved.

6. The multistage bypass valve of claim 2, wherein the temperature at which the second expansive wax expands is higher than a temperature at which the first expansive wax is expanded.

7. The multistage bypass valve of claim 1, wherein a fixing part protrudes from one side of the housing such that the boot is fixed to the housing.

8. The multistage bypass valve of claim 1, wherein one end of the spool is inserted into the housing such that the spool passes through the chambers, and a second end of the spool protrudes to the outside of another side of the housing to be connected to the piston.

9. The multistage bypass valve of claim 8, wherein one end of the spool comprises a wedge shape such that the spool moves to an opposite side as the expansive wax are expanded.

10. The multistage bypass valve of claim 1, further comprising a cover including a hole through which the spool passes to be moved at one end of the housing.

\* \* \* \* \*